United States Patent [19]
Matthews, Jr.

[11] 3,751,932
[45] Aug. 14, 1973

[54] RECOVERY AND REPAIR OF OFFSHORE PIPELINES

[75] Inventor: Jamie F. Matthews, Jr., Houston, Tex.

[73] Assignee: Esso Production Research Company, Houston, Tex.

[22] Filed: Feb. 16, 1972

[21] Appl. No.: 226,778

[52] U.S. Cl............... 61/72.1, 61/72.3, 15/104.06, 138/93, 294/93
[51] Int. Cl............................. F16l 1/00, F16l 55/12
[58] Field of Search........................... 61/72.3, 72.1; 138/93, 8; 295/93, 96, 88; 166/153, 156, .5; 15/104.06

[56] References Cited
UNITED STATES PATENTS

| | | | |
|---|---|---|---|
| 3,498,333 | 3/1970 | Jones | 138/93 |
| 2,228,630 | 1/1941 | Kail | 166/156 X |
| 2,759,757 | 8/1756 | Pace | 294/93 |

Primary Examiner—Jacob Shapiro
Attorney—James A. Reilly, James E. Reed et al.

[57] ABSTRACT

The end of an underwater pipeline is recovered from the bottom of a body of water by inserting a pigging element into the end of the pipeline, injecting a gas into the end of the line behind the pigging element until a section of the line sufficiently long to reach to the surface of the body of water has been voided of liquids, and thereafter lifting the end of the line to the water's surface. Apparatus which is particularly useful in such recovery operations includes a housing closed at one end and open at the other, a gas inlet in the housing near the closed end, means near the open end for engaging the end of a pipe and forming a seal therewith, a pigging element in the housing between the gas inlet and open end, and means for attaching a cable to the end of the pipeline for lifting the pipeline to water's surface.

20 Claims, 6 Drawing Figures

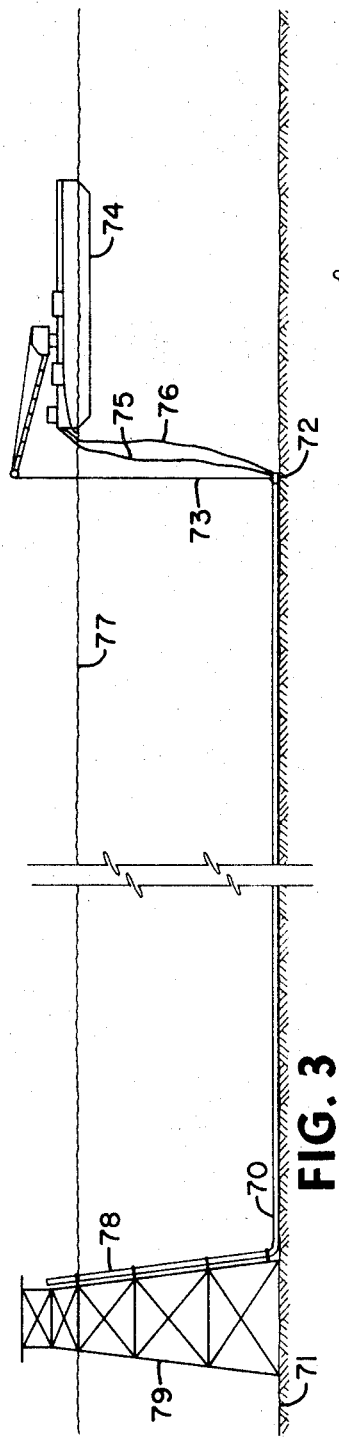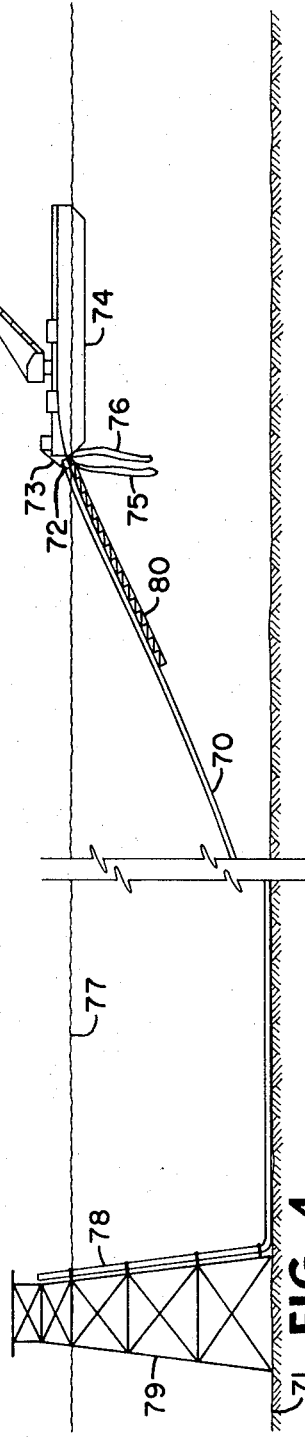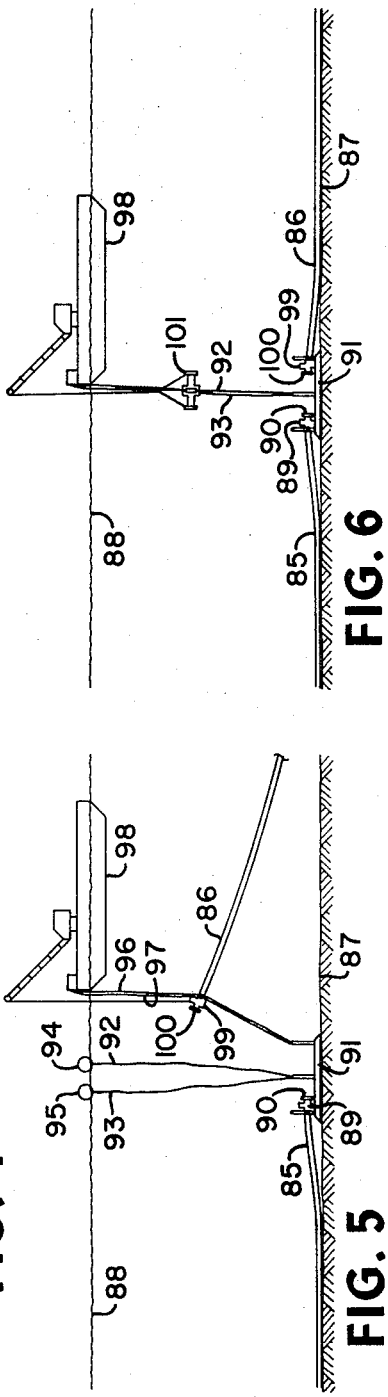

RECOVERY AND REPAIR OF OFFSHORE PIPELINES

BACKGROUND OF THE INVENTION

1. Field of the Invention

This invention relates to the recovery and repair of underwater pipelines and is particularly concerned with a method and apparatus for recovering the ends of damaged lines from the ocean floor.

2. Description of the Prior Art

Marine pipelines are generally installed by lowering them into place on the sea floor from the stern of a moving laybarge or similar vessel. As the pipe leaves the vessel, it bends under its own weight and thus assumes a generally S-shaped configuration between the stern of the vessel and the sea floor. The amount of bending which occurs depends upon the weight and dimensions of the pipe, the depth of the water, the amount of tension maintained in the line, and other factors. Excessive bending will result in buckling or kinking of the pipe and hence a pipe discharge ramp or stinger which extends into the water behind the barge and supports the pipe is normally used to limit the radius of curvature. Despite the precautions normally taken, however, buckling and flooding may occur, particularly if the vessel is caught in a sudden storm and the mooring system, tensioning equipment, or stinger fails for some reason. This normally requires that the pipeline be raised to the surface and repaired.

The methods used for recovering a pipeline after it has buckled during laying of the line are time-consuming and expensive. Before the line can be raised to the surface, it generally has to be voided to prevent overstressing of the pipe and additional buckling. This normally requires the use of a diver to cut off the damaged portion of the pipe with an underwater electric arc-oxygen cutting torch, burn holes through the pipe walls, and then install a bar or long bolt through the holes to block the end of the pipe. After this has been done, a pig is inserted into the line at an accessible point onshore or at an offshore platform to which the line is connected. Compressed air is then introduced into the line behind the pig to displace water from it. After the pig has reached the blocked end and liquids have thus been displaced, the end is raised to the surface by means of cables. The end can then be cut off to permit the welding in place of a new section of pipe and the resumption of pipelaying operations. Methods similar to these are used for the recovering and repair of pipelines that have been damaged in service.

A major disadvantage of the method outlined above is that it usually requires that the pig be run through the line from the point of origin to the point at which the damage exists. This may involve a distance of several miles and may require the operation of air compressors for long periods of time. It may be difficult to provide suitable compressors at the required location and, if the line contains oil or a similar material at the time the damage occurs, the pigging operation will result in discharge of the contents into the water, causing pollution problems. As a result of these and other difficulties, the methods currently used leave much to be desired.

SUMMARY OF THE INVENTION

The present invention provides a new and improved method and apparatus for the recovering and repair of offshore pipelines which alleviates many of the difficulties outlined above. The method, which can be used on both new lines that have been damaged during pipelaying operations and older lines damaged after they have been placed in service, normally involves cutting of the line at or near the point where the damage has occurred. This can be done with mechanical cutters, explosive charges, electric arc-oxygen torches, or other means. After the line has been parted, a pipeline pigging element is inserted in the end of the line and a gas is injected into the line from a compressor located on a nearby barge or similar vessel. Air or gas is introduced into the line until the sea water or other liquid present in the pipeline has been displaced from a section of the line at least as long as that which is to be lifted off bottom. The end of the pipeline is then raised to the surface of the water by means of cables. If the line is a new one which has been damaged during pipelaying operations, the end suspended above the water can be cut off and welded to the end of a section of pipe on the laybarge to permit the resumption of operations. If it is an old line that has been damaged after having been placed in service, the procedure described will normally be repeated for the other end of the line. Once both ends have been lifted out of the water, a replacement section can be welded in place or mechanical apparatus can be installed to permit reconnection of the ends after they have been lowered back into place on the sea floor.

The apparatus of the invention is particularly useful in carrying out the method described above. This apparatus includes a housing which can be lowered into position adjacent the severed end of the pipeline and introduced into the line or fitted over it. The housing is provided with hydraulically actuated slips and packing elements which contact the pipe surface to effect a seal. The end of the housing contains an inlet to which an air or gas line is attached. A sphere or similar pigging element is positioned within the housing so that it can move into the pipeline in response to the introduction of air or gas. A cable attached to the housing is used to raise and lower the apparatus and may be used to raise the pipe to the water surface after the apparatus is secured to the end of the pipeline.

The method and apparatus of the invention have pronounced advantages over systems used for the recovery and repair of underwater pipelines in the past. They often eliminate the necessity for evacuating long sections of pipeline, permit recovery and repair operations to be carried out more rapidly than might otherwise be feasible, reduce the loss of oil and other materials from pipelines damaged after they have been placed in service, permit repairs to be carried out without the extensive use of divers, and often make possible pipeline recovery and repair at substantially lower cost than is possible with other systems.

BRIEF DESCRIPTION OF THE DRAWING

FIG. 3 illustrates use of the method of the invention for the recovery of a pipeline following an interruption in pipelaying operations;

FIG. 4 depicts a later stage in the operation shown in FIG. 3;

FIG. 5 depicts an early stage in the repair, by the method of the invention, of a pipeline which has been damaged in service; and FIG. 6 shows a later stage in the repair of the pipeline of FIG. 5.

DESCRIPTION OF THE PREFERRED EMBODIMENTS

Figure 1:
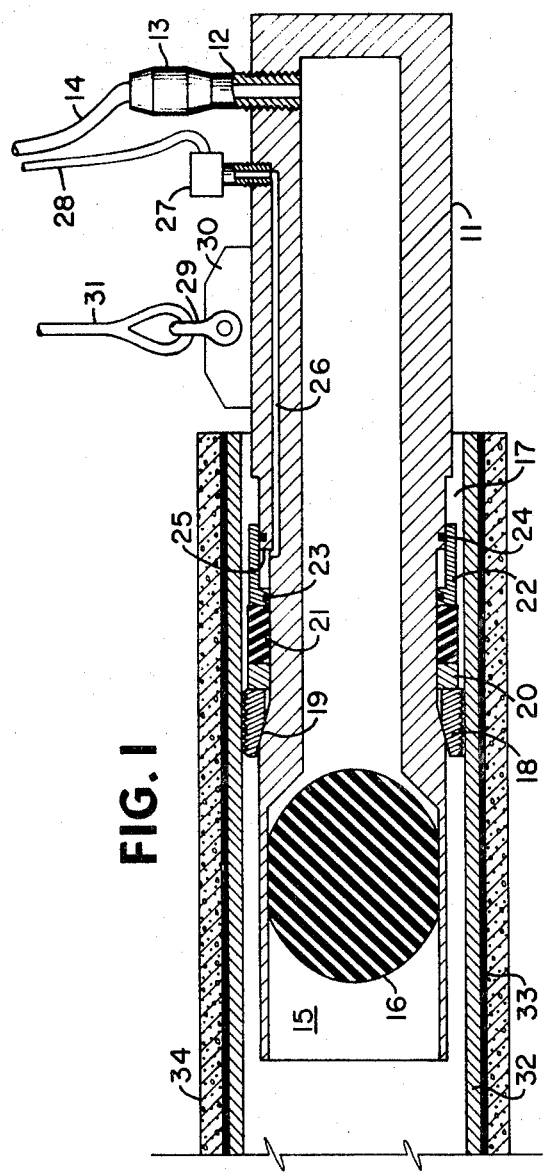
FIG. 1 in the drawing shows, in longitudinal cross section, one embodiment of the apparatus of the invention in place on the end of a damaged underwater pipeline.

The apparatus shown in FIG. 1 of the drawing includes an elongated tubular housing 11 of steel, cast iron, or similar material. One end of this housing is closed and provided with a gas inlet 12 to which a check valve 13 is attached. Gas line 14 extends from the check valve to an air compressor or other gas source not shown in the drawing. The other end of the housing is open and contains a recess 15 within which is positioned a resilient pigging sphere or similar element 16 of rubber or like material. The outer surface of the housing contains a circumferential recess 17 within which slips 18 are positioned. The outer faces of the slips are provided with teeth or similar projection. The undersides are tapered where they contact tapered shoulder 19 in the recess. A spring or other means not shown in the drawing retains the slips in place within the recess. A backing ring 20 is positioned in the recess behind the slips. A sealing element 21, of rubber or other resilient material, is located adjacent the backing ring. An annular piston 22 provided with an inner flange containing a seal ring 23 bears against the sealing element. A second seal ring 24 is located behind shoulder 25 in the recess. The space formed by the piston and the bottom of the recess between the two seal rings serves as a cylinder into which hydraulic fluid may be introduced through a passageway 26 in the housing wall. This passageway extends to a check valve 27 to which hydraulic line 28 is connnected. A shackle 29 is mounted on a padeye 30 attached to the outer surface of the housing and a pickup cable 31 extends through this shackle. Gas line 14 and hydraulic line 28 may be attached to the pickup cable to facilitate handling.

The apparatus of FIG. 1 is shown in place in the end of a pipeline 32, which may be provided with an outer corrosion coating 33 and a concrete jacket 34. It will be apparent that the dimensions of the apparatus will be primarily determined by the inside diameter of the pipe with which the device is to be used. In general, the outer diameter of the housing should be such that the device will slip into the end of the pipe to be recovered and permit the development of a fluid-tight seal between the housing and the inner pipe wall. The diameter of recessed section 15 should normally be as large as practicable so that a pigging sphere 16 of the size required by the pipe can be accommodated without difficulty. It will be recognized that the apparatus is not restricted to the use of a sphere as shown and that other pigging elements capable of expanding to the desired size may be employed. The use of a sphere, however, has particular advantages because it may be introduced into recessed section 15 in a partially deflated condition and then pressured up to the desired pressure and volume by the introduction of water or other liquid.

Figure 2:
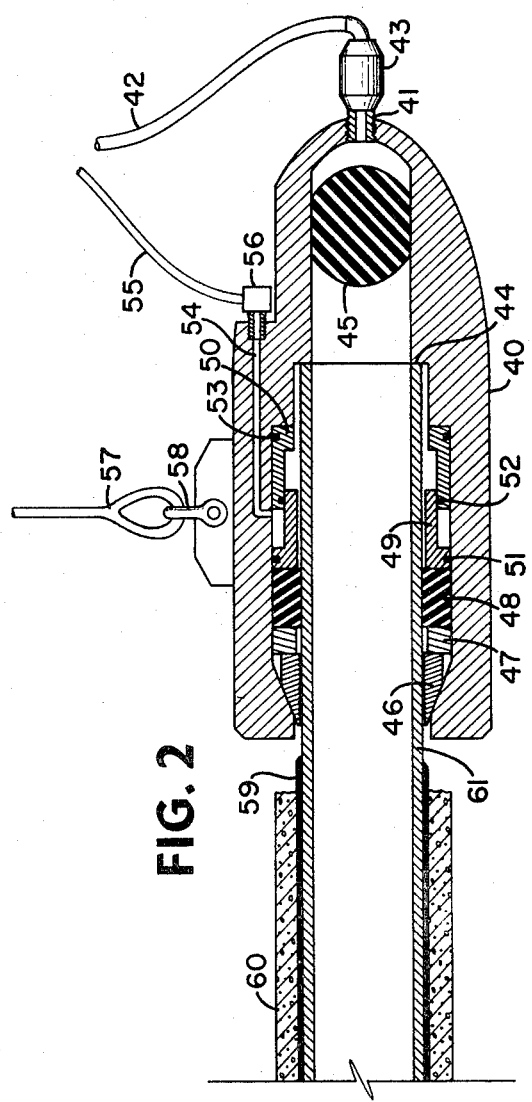
FIG. 2 is a longitudinal cross section through an alternate embodiment of the apparatus of the invention.

FIG. 2 in the drawing depicts an alternate embodiment of the apparatus which is similar to the device shown in FIG. 1 but is intended to effect a seal against the outer wall of the pipe instead of the inner wall. This embodiment includes an elongated tubular housing 40 which is closed at one end and provided with a gas inlet 41 to which gas line 42 is connected through check valve 43. The inner diameter of the housing is such that the housing will slip over the end of the pipe to be recovered until the pipe reaches an inner shoulder 44. Pigging sphere or similar element 45 is positioned in the housing between this shoulder and the gas inlet 41. Slips 46, backing ring 47 and sealing element 48 are positioned within a circumferential recess in the inner wall of the housing. Flanged pistons 49 and 50 provided with seal rings 51, 52, and 53 are positioned between the sealing element and the end of the recess. Hydraulic fluid inlet 54 extends through the housing wall into the space between the two pistons. The hydraulic fluid used to actuate the pistons is introduced through hydraulic line 55 and valve 56. Pickup cable 57 is attached to the housing by means of shackle 58 and again the hydraulic and gas lines may be attached to the cable if desired. The dimensions of the apparatus of FIG. 2 will be determined primarily by the outside diameter of the pipe with which the device is to be used. The use of this embodiment of the invention normally requires that the corrosion coating 59 and the cement jacket 60 be removed from the end of the pipeline 61 before the device is installed. This can generally be accomplished without difficulty but in some cases use of the apparatus of FIG. 1 to avoid the necessity for such removal may be preferred.

FIG. 3 in the drawing depicts use of the apparatus described above or similar equipment for recovering the end of a submerged pipeline 70 from the bottom 71 of a body of water following an interruption in pipelaying operations. The interruption may have occurred as a result of equipment malfunction during a severe storm which resulted in dropping, buckling and flooding of the pipe. As shown in FIG. 3, the damaged portion of the line, if any, has been cut off with an electric arc-oxygen torch, explosive charges, a mechanical cutter, or other conventional equipment. This can be accomplished by divers or in very deep water can be carried out with a submersible vessel fitted with manipulators. A device 72 of the type shown in FIG. 1 has been lowered on a cable 73 from a pipelaying barge or similar vessel 74 moored near the end of the line and has been inserted into the end of the pipe by divers or a manipulator-equipped submersible vessel. The stinger to be used on the barge after pipelaying operations are resumed need not be in place during this phase of the operation and can be connected in place later. Hydraulic line 75 and air line 76 extend upwardly along the cable to the barge. Once the device has been inserted, hydraulic fluid is pumped down line 75 to set the slips and expand the sealing element of the device against the inner pipe wall. The slips hold the device in place; while the seal prevents the escape of injected air from the end of the pipeline into the surrounding water.

Following installation of the device in the end of the pipeline as described above, compressed air is introduced into the pipeline through air line 76. This injected air forces the pigging sphere to move through the pipeline, displacing water in the line ahead of it. Air injection is continued until water has been displaced from the portion of the line which will be suspended off bottom when the pipe is subsequently raised to the surface 77 of the body of water. The amount of air that will have to be injected and the length of the line from which water will have to be evacuated will depend primarily upon the size of the pipe, the depth of the water, and the slope of the installed portion of the pipeline. If the pipeline slopes downwardly from the end being recovered, and if a riser 78 to the atmosphere has been installed on an offshore platform 79 as shown in FIG. 3, or if the remote end of the pipeline is on bottom and is fitted with a check valve oriented to permit only outflow from the pipeline, it will be necessary to displace water from only a relatively short length of the line. This length can be determined by calculating the configuration of the dewatered line after the end has been raised from the bottom to the surface of the water. Calculations of this type are easily made and will be familiar to those skilled in the art. The amount of air injected should be sufficient to displace the water from substantially all of the pipe to be suspended above the bottom. Otherwise, the weight of the flooded pipe may be so great that additional buckling will take place. After the required amount of water has been displaced from the end of the line, the end can be raised from the bottom to the water's surface and vented to the atmosphere without danger of water flowing back into the suspended portion of the line when the sealing unit is removed. If, however, the remote end of the pipeline is at a substantially higher elevation than the end being recovered, as may be the case where pipeline construction originates at or near the shore and proceeds into deeper water, then the entire installed portion of the pipeline will normally have to be dewatered to prevent backflow into the suspended portion when the end is opened to the atmosphere. With the pipe voided, there is little risk of buckling the line during the recovery and repair operation if the required amount of tension is maintined in the suspended pipe or if a sufficient number of pickup cables to control pipe bending stresses within safe limits are employed.

To permit the resumption of pipelaying operations from barge 74 after air has been injected and the pipeline has been lifted off bottom, the pipeline will normally be pulled to the surface over a stinger 80 connected in place at the stern of the pipelaying barge as shown in FIG. 4 of the drawing. After the end of the line is in position on the barge, the equipment used for the injection of air and displacement of water can be removed and a new section of pipe can be welded in place. Normal pipelaying operations can then be resumed.

It will be understood that the method described above is not restricted to use of the particular apparatus shown in FIGS. 1 and 2 of the drawing. Although the apparatus of FIGS. 1 and 2 facilitates carrying out the method, other equipment for accomplishing the same purpose can be devised. In relatively shallow water, for example, a conventional pipeline pig can be inserted in the end of the line and a bull plug or similar device fitted with an air line and suitable packing can be welded or mechanically connected in place. The use of such equipment in lieu of that shown in the drawing will be apparent to those skilled in the art.

As indicated earlier, the method and apparatus of the invention can also be used for the recovery and repair of pipelines that have been damaged in service. FIG. 5 in the drawing shows an early stage in the repair of such a pipeline. As depicted in FIG. 5, the damaged section of the pipeline has been cut away and lifted to the surface for return to shore. Following cutting of the line, devices of the type shown in FIG. 1 of the drawing were installed on each end of the line in order to minimize the loss of oil from the line and permit lifting of the ends to the surface without danger of buckling. Oil contained in one end of the line was displaced into tankage on an offshore platform and thence into a barge moored near the platform; while that contained in the other line was displaced into tankage on shore. Much of the oil that would otherwise have been lost was thus recovered and the amount of oil cleanup necessary following the repair operation was thus reduced. After one end of the line had been raised to the surface, a full-opening valve 89 provided with a remote connector hub 90 was welded onto the end. The valve was closed and this end of the line was then lowered back to the bottom with a guide base 91 provided with three sets of guidelines. FIG. 5 shows the guide base in place with end 85 provided with valve 89 and connector hub 90 in position on the base. The guidelines adjacent end 85 have been removed. Guidelines 92 and 93, which will be employed to place the remote connector section, have been attached to floats 94 and 95 to permit their recovery and use later. Guidelines 96 and 97, which extend to posts on the other end of guide base 91, are being used to lower the other end 86 of the pipeline back into place on the bottom from barge 98. A fullopening valve 99 and a remote connector hub 100 are in place on end 86.

After the two pipeline ends equipped with valve and connector hubs have been positioned on the guide base as illustrated in FIG. 5, the ends are reconnected as shown in FIG. 6 of the drawing. This is done by lowering a remote connector section 101 dowwardly into position on guidelines 92 and 93. The rmote connector may be of conventional design and will normally be actuated by hydraulic lines which are not shown in the drawing. After the connector is seated on the guide posts on base plate 91, the application of hydraulic pressure to the proper lines permits remote connection of the two ends through the connector. After this has been done, the two valves 89 and 99 can be opened remotely or by divers and the line can be pigged out to permit the resumption of normal service. It will be apparent that the pipeline ends can be joined by means other than the remote connector system employing a guide base if desired. It may be preferred, for example, to join the ends by divers using mechanical devices or by welding in a dry atmospheric hyperbaric chamber. In either case, however, a full-opening valve will normally be installed on each end of the line to prevent flooding of the suspended pipeline as it is lowered back to bottom.

I claim:

1. A method for recovering the end of a submerged pipeline from the bottom of a body of water which comprises inserting a pigging element into said end of said pipeline, injecting a gas into the end of the pipeline behind said pigging element while preventing the escape of substantial quantities of gas from the pipeline into the surrounding water, continuing the injection of said gas until said pigging element has been displaced by the gas through a section of the pipeline sufficiently long to extend at least to the surface of said body of water, and thereafter lifting said end of said pipeline to said surface of said body of water.

2. A method as defined by claim 1 wherein said pipeline includes a check valve which prevents the backflow of liquids displaced by said pigging element and said gas is injected until said pigging element has displaced substantially all liquids from the portion of the pipeline between said check valve and said end.

3. A method as defined by claim 1 wherein said pipeline is open to the atmosphere at a point remote from said end and said gas is injected until said pigging element has displaced substantially all liquids from the pipeline.

4. A method as defined by claim 1 wherein said gas is air.

5. A method as defined by claim 1 wherein said pipeline includes an outer cement coating and said coating is removed from about said end prior to the insertion of said pigging element.

6. A method as defined by claim 1 wherein said gas is injected through a line extending from a floating vessel moored near said end to said end of said pipeline.

7. A method as defined by claim 1 wherein said end of said pipeline is formed by cutting off a damaged portion of the pipeline on the bottom of said body of water prior to the insertion of said pigging element.

8. A method as defined by claim 1 wherein said pigging element is a pigging sphere.

9. A method as defined by claim 1 wherein an additional section of pipe is connected to said pipeline after said end has been lifted to the surface of said body of water and said pipeline is thereafter lowered back to the bottom of said body of water.

10. A method as defined by claim 1 wherein a full-opening valve is connected to said pipline after said end has been lifted to the surface of said body of water and said pipeline is thereafter lowered back to the bottom of said body of water.

11. A method as defined by claim 10 wherein said end is equipped with a full-opening valve, a remote connector hub, and a guide base before said pipeline is lowered back to the bottom of said body of water.

12. Apparatus for recovering the end of a submerged pipeline from the bottom of a body of water which comprises an elongated tubular housing closed at one end and open at the other end, a gas inlet in said housing near the closed end, slips supported by said housing near the open end thereof for engaging the end of a pipe extending concentrically withrespect to said housing, a resilient sealing element supported by said housing near the open end thereof for forming a seal between said housing and the wall of said pipe, a piston in said housing for setting said slips and said selaing element, a hydraulic fluid inlet in said housing for introducing a fluid to actuate said piston, and a resilient, displaceable pigging element in said housing between said gas inlet and said open end.

13. Apparatus as defined by claim 12 wherein said slips and resilient sealing element are positioned on the inner surface of said housing near said open end.

14. Apparatus as defined by claim 12 wherein said slips and resilient sealing element are positioned on the outer surface of said housing near said open end.

15. Apparatus as defined by claim 12 wherein said pigging element is a resilient sphere.

16. Apparatus as defined by claim 12 including a check valve on said gas inlet for preventing the backflow of gas from said housing.

17. Apparatus for use in offshore pipelining operations which comprises an elongated tubular housing having an opening at one end thereof of sufficient internal diameter to receive the end of a marine pipeline, a gas inlet near the other end therof, and a hydraulic fluid inlet in the wall thereof; a slidable annular piston positioned in said housing, said piston and housing forming an expansible chamber communicating with said hydraulic fluid inlet; a resilient annular sealing member within said housing near said open end therof, said sealing member being of sufficient internal diameter to receive said end of said marine pipeline and of sufficient external diameter to effect a seal between said housing and said end of said pipeline; and pipe retaining means responsive to movement of said piston for engaging and holding said end of said marine pipeline, said pipe retaining means being positioned within said housing near said opening in said end thereof.

18. Apparatus for use in offshore pipelining operations which comprises an elongated tubular housing having an opening in one end thereof, a gas inlet in the other end thereof, and a hydraulic fluid inlet in the wall thereof; a slidable annular piston mounted on said housing, said piston and housing forming an expansible chamber communicating with said hydraulic fluid inlet; a resilient annular sealing member mounted on said housing near said end containing said opening, the dimensions of said sealing member being sufficient to effect a seal between said housing and the end of a marine pipeline into which said housing is inserted; and pipe retaining means responsive to movement of said piston for engaging and holding said end of said marine pipeline, said pipe retaining means being positioned on said housing near said one end containing said opening.

19. Apparatus for use in offshore pipelining operations which comprises an elongated tubular housing having an opening in one end thereof, a gas inlet near the other end thereof, and a hydraulic fluid passageway in the wall thereof; a slidable annular piston forming with said housing an expansible chamber communicating with said hydraulic fluid passageway in said wall of said housing; a resilient annular sealing member positioned between said piston and said opening in said end of said housing, the dimensions of said sealing member being sufficient to effect a seal between said housing and the end of a marine pipeline extending concentrically with said housing; and pipe retaining means responsive to movement of said piston for engaging and holding said end of said marine pipeline, said pipe retaining means being positioned near said opening in said end of said housing.

20. Apparatus for use in pipeline repair operations which comprises an elongated tubular housing having an opening in one end thereof, a gas inlet in the other end thereof, and a hydraulic fluid inlet in the wall thereof, said opening in said one end of said housing and the interior of said housing being of sufficient size to accommodate an expansible pigging element and permit the displacement of said pigging element from said housing; a sealing member supported by said housing near said one end for forming a seal between said housing and the wall of a pipeline extending concentrically with said housing; pipe retaining means supported by said housing near said one end for engaging and holding said pipeline; and hydraulic means for actuating said sealing member and pipe retaining means in response to fluid introduced into said housing through said hydraulic fluid inlet.

* * * * *